(12) United States Patent
Harada et al.

(10) Patent No.: US 6,687,832 B1
(45) Date of Patent: Feb. 3, 2004

(54) CONTROL OF TOPOLOGY VIEWS IN NETWORK MANAGEMENT

(75) Inventors: Asuro Harada, Kawasaki (JP); Yuki Kajitani, Kawasaki (JP); Yasuhiro Yamaguchi, Kawasaki (JP); Hiroaki Abe, Kawasaki (JP); Naoki Hayashi, Sapporo (JP); Satoshi Nagai, Sapporo (JP); Takeshi Aihana, Sapporo (JP); Fumiyoshi Tomohara, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/370,734

(22) Filed: Aug. 9, 1999

(30) Foreign Application Priority Data

Sep. 1, 1998 (JP) .......................... 10-246722

(51) Int. Cl.[7] ................................ H04L 9/00
(52) U.S. Cl. ...................................... 713/201
(58) Field of Search ................. 713/201, 200, 713/182; 709/223, 224, 225

(56) References Cited

U.S. PATENT DOCUMENTS 5,537,099 A * 7/1996 Liang ..................... 340/5.74
5,758,083 A * 5/1998 Singh et al. .............. 709/223
6,438,591 B1 * 8/2002 Fehskens et al. .......... 709/223

FOREIGN PATENT DOCUMENTS

| JP | 64-5246 | 1/1989 |
| JP | 5-225032 | 9/1993 |
| JP | 9-293052 | 11/1997 |

* cited by examiner

Primary Examiner—Matthew Smithers
(74) Attorney, Agent, or Firm—Katten Muchin Zavis Rosenman (57) ABSTRACT

A system for controlling topology views for operators in network management includes a data-storage unit which stores data of a base topology view, a security-management unit which controls access-authorization information with respect to each of the operators, the access-authorization information for a given operator defining network elements accessible by the given operator, and a topology-view-management unit which generates data of a dependent topology view by making a partial copy of the data of the base topology view only with respect to the network elements accessible by the given operator, thereby providing the dependent topology view to be presented to the given operator.

8 Claims, 9 Drawing Sheets

CONTROL OF TOPOLOGY VIEWS IN NETWORK MANAGEMENT

BACKGROUND OF THE INVENTION

1. Field of the Invention

The present invention relates to systems for controlling topology views which display a network structure of a management-object network, and particularly relates to a system for controlling topology views which controls creating, modifying, referring of a topology view with respect to each layer of hierarchy when control of a network is divided into a plurality of layers.

2. Description of the Related Art

An information-communication network is formed by connecting together various network elements such as switch devices, transit devices, bridges, computers, etc. Such a network typically includes a plurality of networks having different operation styles such as wide-area networks operated by a plurality of communication-service providers and small intra-networks operated by single corporations. Such networks are connected in a hierarchical fashion to form the entire network.

A network-management operator accesses a network of a given layer so as to attend to operation management of a relevant network domain. This needs to be done layer by layer. Because of this, network operators are urging for such an enhancement of a network-management system that network-management operators can perform more efficiently the operation management of each network having a different operation style at a different layer, thereby enhancing quality of communication services provided to the network users.

An international effort for standardization has been made with an aim of achieving an efficient network-operation management. This effort is coordinated by such an organization as ITU-T or OSI involving not only a large number of network-operation providers but also vendors manufacturing network-element devices such as switches.

The present invention relates to a system for controlling topology views for the purpose of providing a visual display of a link structure of network elements in a network having a hierarchical structure and for the purpose of providing secure and efficient control of the network.

When accessing a topology view in network management, each network-management operator is given an access authorization with respect to a given network layer, so that a network-management operator can only access a topology view to which an appropriate access right is granted. Because of this configuration, a network-management system of each network is provided with different topology views that are configured according to different access authorizations given to network-management operators.

Where a plurality of network-management operators are supposed to be given different topology views according to different access authorizations, a simplicity of a process of creating a topology view may be given priority. For example, a topology view created for a network-management operator having the highest access right may be provided to all the relevant network-management operators. As an example of another endeavor, Japanese Patent Laid-open Application No. 5-225032 teaches a directory system which is equipped with a function to customize individual topology views.

When a network-management system needs to be provided with different topology views according to different access authorizations, each one of these topology views has to be created one by one no matter how large the total number of the topology views is. Further, it is painstakingly difficult to keep consistency between the topology views when these topology views are separately created and controlled by different network-management operators.

In the system where a topology view for a network-management operator having the highest access right is provided to all the network-management operators having different access authorizations in consideration of a need for a simplicity of topologi-view creation, it is impossible to prevent illegal access to a topology view without a proper authorization. This results in security breach regarding control of topology data.

Accordingly, there is a need for a system for controlling topology views which can easily create a topology view of a given layer while insuring security regarding control of topology-view data by displaying a topology view of a given layer according to a proper access authorization of a given network-management operator.

SUMMARY OF THE INVENTION

Accordingly, it is a general object of the present invention to provide a system for controlling topology views which can satisfy the need described above.

It is another and more specific object of the present invention to provide a system for controlling topology views which can easily create a topology view of a given layer while insuring security regarding control of topology-view data by displaying a topology view of a given layer according to a proper access authorization of a given network-management operator.

In order to achieve the above objects according to the present invention, a system for controlling topology views for operators in network management includes a data-storage unit which stores data of a base topology view, a security-management unit which controls access-authorization information with respect to each of the operators, said access-authorization information for a given operator defining network elements accessible by the given operator, and a topology-view-management unit which generates data of a dependent topology view by making a partial copy of the data of the base topology view only with respect to the network elements accessible by the given operator, thereby providing the dependent topology view to be presented to the given operator.

In the system as described above, the base-topology-view data is provided in the data-storage unit, and the dependent-topology-view data is generated for the given operator by copying only the accessible elements of the base-topology view in accordance with the access-authorization information. Therefore, there is no need to prepare a large number of topology views in advance for different network-management operators having different access authorizations, and proper security is insured because of use of access authorization information.

Further, since all the dependent topology view are created from the single base topology view by making a partial copy thereof, consistency between the views can be easily maintained.

Other objects and further features of the present invention will be apparent from the following detailed description when read in conjunction with the accompanying drawings.

DESCRIPTION OF THE PREFERRED EMBODIMENTS

In the following, embodiments of the present invention will be described with reference to the accompanying drawings.

Figure 1:
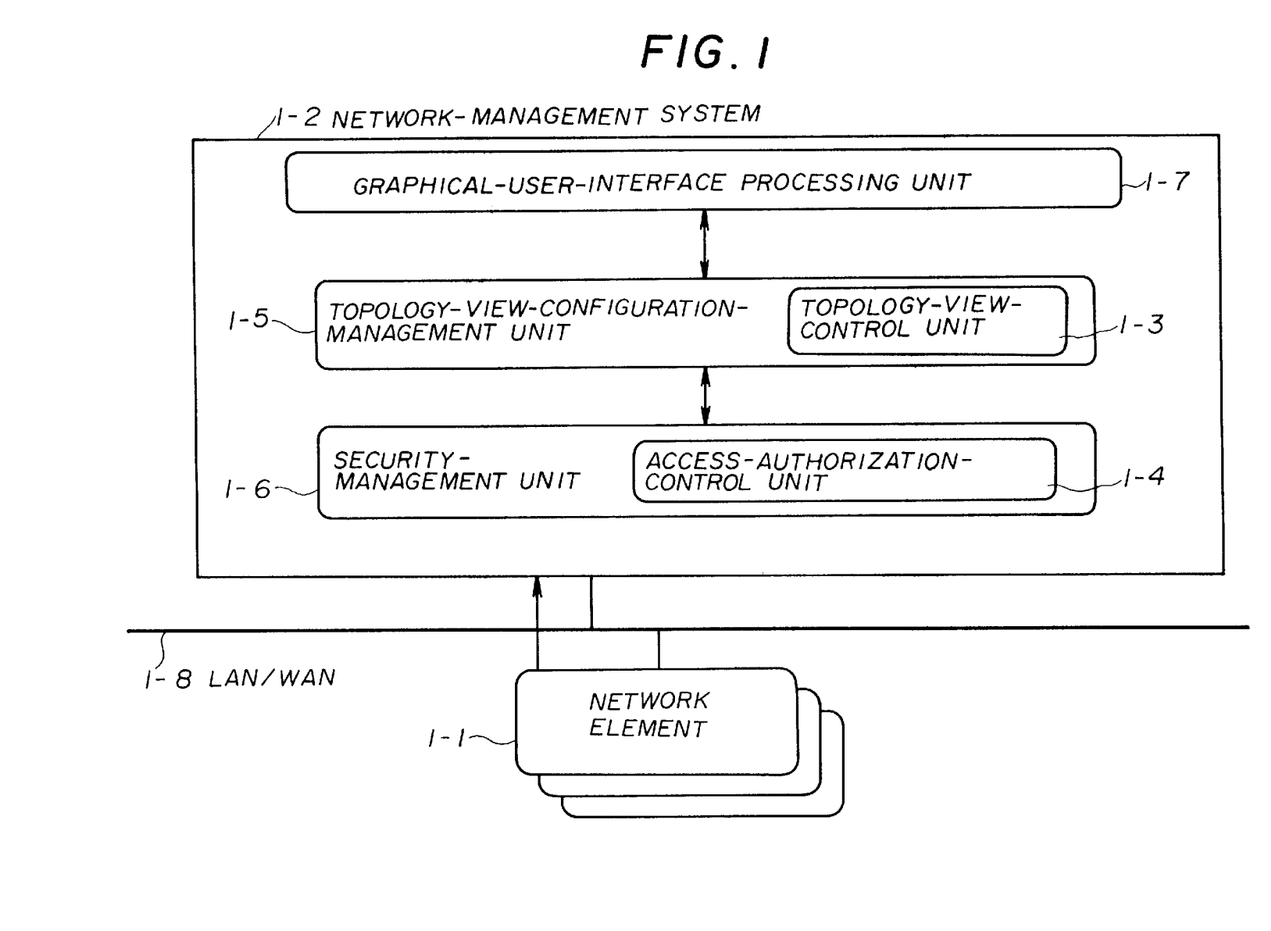
FIG. 1 is an illustrative drawing showing a configuration of a system for controlling topology views according to the present invention.

FIG. 1 is an illustrative drawing showing a configuration of a system for controlling topology views according to the present invention.

In FIG. 1 the system includes network elements (NE) 1-1, a network-management system (NMS) 1-2 controlling the network elements, a topology-view-control unit 1-3, an access-authorization-control unit 1-4, a topology-view-configuration-management unit 1-5, a security-management unit 1-6, an graphical-user-interface processing unit 1-7, and a network 1-8 such as a LAN (local area network) or a WAN (wide-area network).

The network elements 1-1 include various communication-network elements such as switches, transit devices, routers, bridges, computers, etc. The network elements 1-1 are connected to the network-management system 1-2 via the network 1-8.

The network-management system 1-2 includes the topology-view-configuration-management unit 1-5, the security-management unit 1-6, and the graphical-user-interface processing unit 1-7. The topology-view-configuration-management unit 1-5 includes the topology-view-control unit 1-3, and the security-management unit 1-6 includes the access-authorization-control unit 1-4.

The access-authorization-control unit 1-4 registers, modifies, adds, or deletes an access authorization such as a right to create, a right to delete, a right to modify, or a right to refer to a topology view in accordance with a layer of a terminal of a given network-management operator.

The topology-view-control unit 1-3 generates topology-view data of a network configuration that matches access authorizations set by the access-authorization-control unit 1-4 with respect to a terminal of a given network-management operator. The topology-view data may be subjected to shared use by the network operators. Image data of the created topology view is sent to the graphical-user-interface processing unit 1-7.

The graphical-user-interface processing unit 1-7 displays the topology view on the terminal of the network-management operator when the topology view is received from the topology-view-control unit 1-3. Also, the graphical-user-interface processing unit 1-7 attends to input/output processing relating to network management based on the topology view.

The access-authorization-control unit 1-4 and the topology-view-control unit 1-3 serve together to control a topology view in accordance with access authorizations given to a network-management-operator terminal, and insure proper security management regarding access to the topology view.

Figure 2:
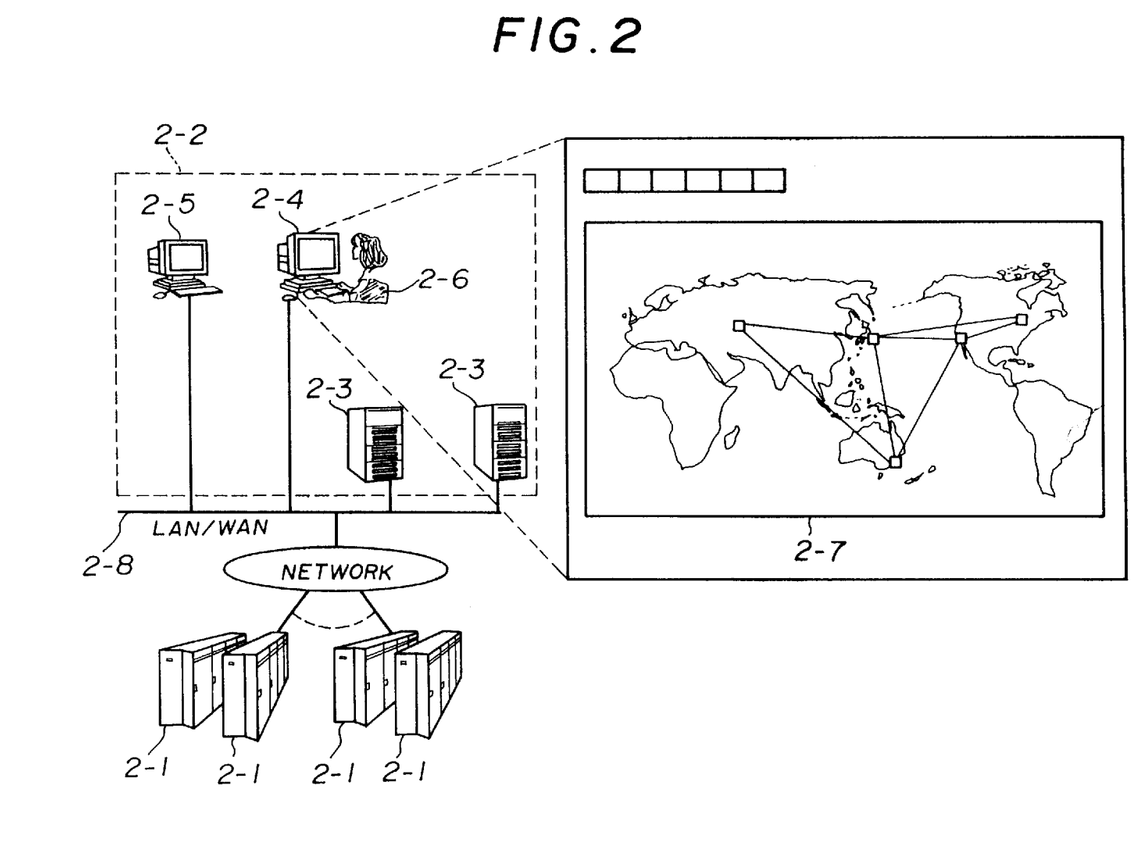
FIG. 2 is an illustrative drawing for explaining the topology-view-control system according to the present invention.

FIG. 2 is an illustrative drawing for explaining a topology-view-control system according to the present invention. A plurality of network elements 2-1 are connected to a network-management system 2-2 via a network 2-8 such as a WAN or a LAN. The network-management system 2-2 attends to management of the network elements 2-1.

The network-management system 2-2 includes a plurality of network-management-server devices 2-3 and a plurality of network-management-client devices 2-4 and 2-5.

When a network-management operator 2-6 attempts to create a topology view by using the network-management-client device 2-4, the access-authorization-control unit of the network-management-server device 2-3 checks access authorizations of the operator to determine whether the operator has the right to create a view.

If the operator has the right to create, the network-management-client device 2-4 is given a right to create a view. As the network-management operator 2-6 actually creates a topology view by using the network-management-client device 2-4, an effect of this operation is reflected by all the network-management-client devices. Namely, the same topology view 2-7 will be displayed on all the network-management-client devices 2-4 and 2-5.

The same applies in the case of other access requests such as deletion, modification, or referring of a topology view. That is, displaying of the topology view 2-7 is controlled based on access authorizations such as the right to delete, the right to modify, and the right to access, which are registered with respect to each network-management operator 2-6.

The topology view 2-7 displayed on the network-management-client devices 2-4 and 2-5 is controlled by the access-authorization-control unit and the topology-view-control unit of the network-management-server devices 2-3. That is, the topologi-view-control unit controls displaying of the topology view 2-7 on screens of the network-management-client devices 2-4 and 2-5 according to access authorizations that are defined by the access-authorization-control unit with respect to each of the network-management-client devices 2-4 and 2-5.

Figure 3:
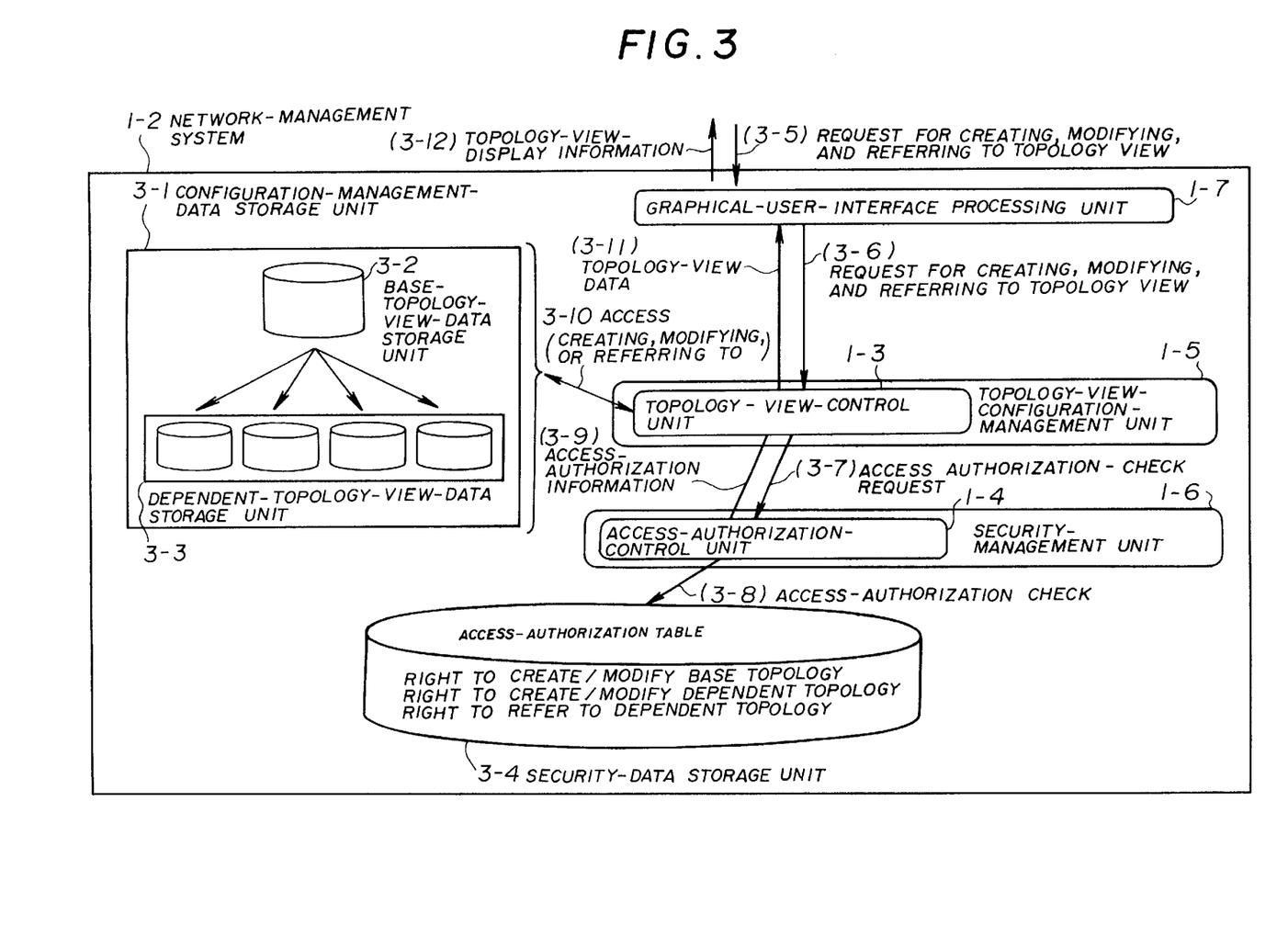
FIG. 3 is an illustrative drawing showing a functional-block diagram of a network-management system according to the present invention.

FIG. 3 is an illustrative drawing showing a functional-block diagram of the network-management system 1-2 according to the present invention. In FIG. 3, the same elements as those of FIG. 1 are referred to by the same numerals, and a description thereof will be omitted.

The network-management system 1-2 includes a configuration-management-data storage unit 3-1 and a security-data storage unit 3-4. The configuration-management-data storage unit 3-1 includes a base-topology-view-data storage unit 3-2 and a dependent-topology-view-data storage unit 3-3. In FIG. 3 and subsequent figures, numerals bracketed between "(" and ")" designate processes or information exchanged between functional elements.

A terminal of a network-management operator transmits an access request (3-5) to the network-management system 1-2 so as to request creating, modifying, or referring of a topology view. In response, the graphical-user-interface processing unit 1-7 issues an access request (3-6) for creating, modifying, or referring of a topology view to the topology-view-control unit 1-3.

The topology-view-control unit 1-3 then sends an access-authorization-check request (3-7) to the access-authorization-control unit 1-4.

The access-authorization-control unit 1-4 makes an access-authorization check (3-8) on the network-management operator who requested access. That is, the access-authorization-control unit 1-4 checks if the network-management operator has appropriate access authorizations regarding creating, modifying, or referring of a topology view by looking into access authorizations defined in an access-authorization table of the security-data storage unit 3-4. The access-authorization-control unit 1-4 sends a result of the check as access-authorization information (3-9) to the topology-view-control unit 1-3.

Based on the access-authorization information (3-9), the topology-view-control unit 1-3 accesses (3-10) the base-topology-view-data storage unit 3-2 or the dependent-topology-view-data storage unit 3-3 in the configuration-management-data storage unit 3-1 if the network-management operator who requested access has access authorizations. The topology-view-control unit 1-3 attends to processing of creating, modifying, or referring to a topology view, and sends topology-view data (3-11) to the graphical-user-interface processing unit 1-7.

The graphical-user-interface processing unit 1-7 transmits topology-view-display information (3-12) based on the received topology-view data (3-11), thereby displaying the topology view on the screen of the terminal of the network-management operator.

In the manner as described above, a base topology view or a dependent topology view that is accessible by the network-management operator according to the access-authorization information (3-9) is displayed on the terminal of the network-management operator, so that a legitimate operator having appropriate access authorizations can create, modify, or access the topology view.

Figure 4:
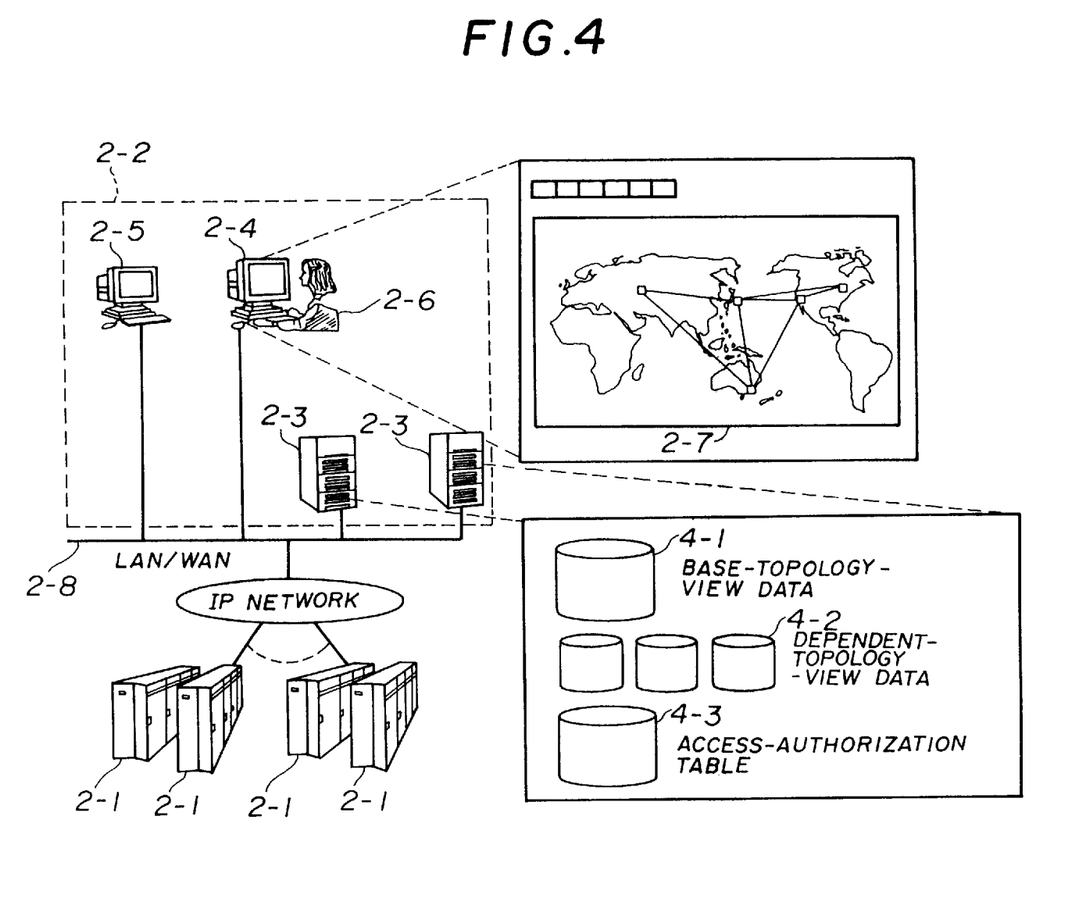
FIG. 4 is an illustrative drawing for explaining storage of topology-view data and security data according to the present invention.

FIG. 4 is an illustrative drawing for explaining storage of topology-view data and security data according to the present invention. In FIG. 4, the same elements as those of FIG. 2 are referred to by the same numerals, and a duplicate description thereof will be omitted.

The network-management-server devices 2-3 store therein files of base-topology-view data 4-1, dependent-topology-view data 4-2, and security data such as an access-authorization table 4-3. When an access request is made from a network-management operator, appropriate topology-view data in accordance with the access authorizations is taken out from the files, and is transmitted to the network-management-client device 2-4.

Figure 5:
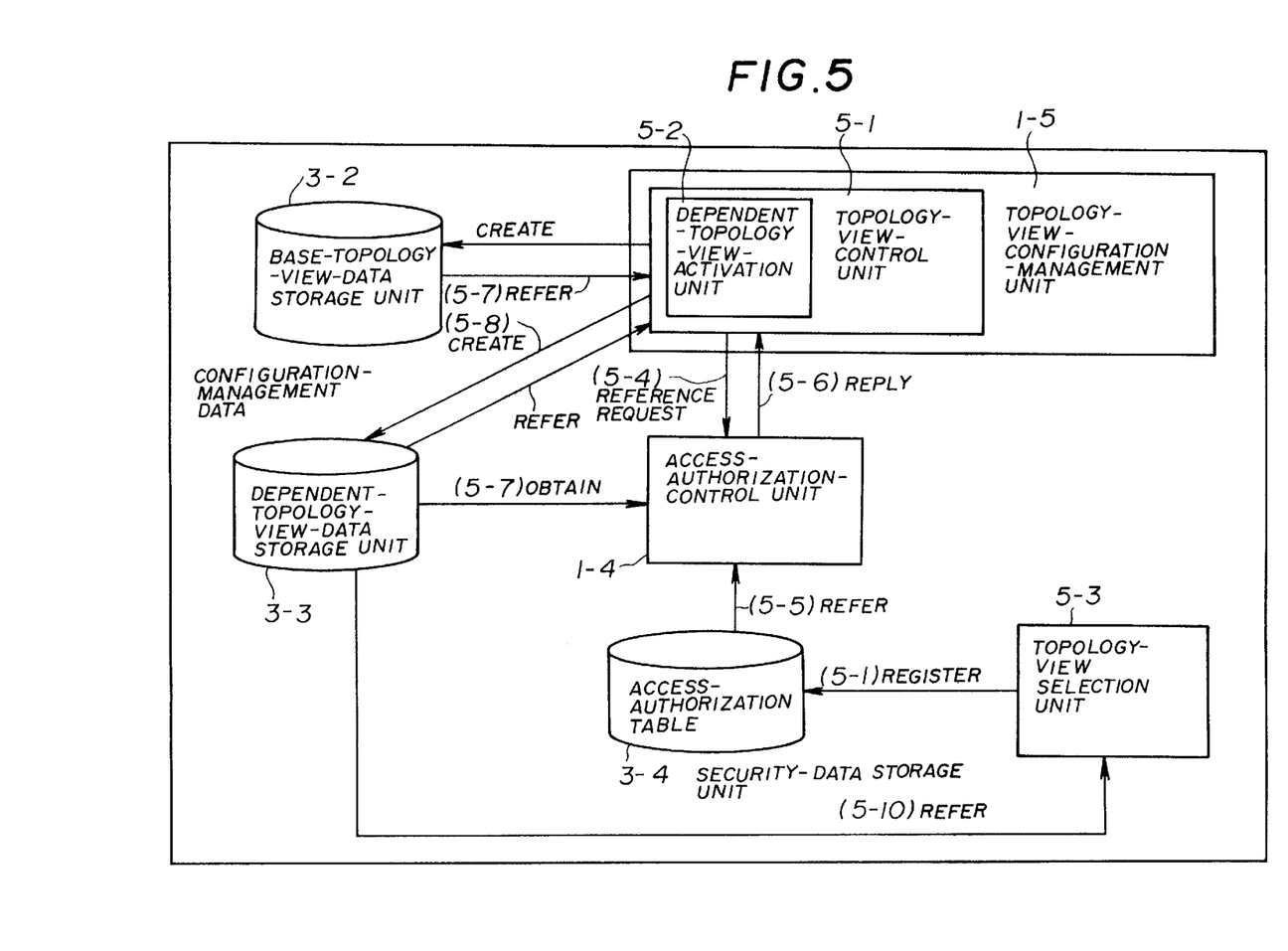
FIG. 5 is an illustrative drawing for explaining control of creating, selecting, and referring to a topology view according to the present invention.

FIG. 5 is an illustrative drawing for explaining the control of creating, selecting, and referring to a topology view according to the present invention. In FIG. 5, the same elements as those of FIG. 1 and FIG. 3 are referred to by the same numerals.

Creation of a dependent topology view will be described first. When an operator terminal issues a request for creation of a topology view, the request is conveyed to a topology-view-control unit 5-1 of the topology-view-configuration-management unit 1-5.

The topology-view-control unit 5-1 is equipped with a function to control a base topology view and a plurality of dependent topology views in addition to the functions of the topology-view-control unit 1-3 previously described. The topology-view-control unit 5-1 attends to access control of main-topology-view data with regard to creating, modifying, and referring thereof, and attends to access control of dependent-topology-view data with regard to creating, modifying, and referring thereof. Such access control is achieved based on the access authorization information passed from the access-authorization-control unit 1-4.

The topology-view-control unit 5-1 sends a reference request (5-4) to the access-authorization-control unit 1-4 so as to check authorization to create a dependent topology view and to obtain information regarding network elements and links which are accessible by the network-management-operator terminal.

The access-authorization-control unit 1-4 refers (5-5) to the access-authorization table of the security-data storage unit 3-4, and checks if the network-management-operator terminal that issued the access request has the right to create a dependent topology view. Also, network elements and links therebetween that are accessible by the network-management-operator terminal are identified. The access-authorization-control unit 1-4 then sends a reply (5-6) to the topology-view-control unit 5-1.

Based on the reply (5-6) from the access-authorization-control unit 1-4, the topology-view-control unit 5-1 uses a dependent-topology-view-activation unit 5-2 of the topology-view-control unit 5-1. The dependent-topology-view-activation unit 5-2 accesses (5-7) data of network elements and links of the base-topology-view data stored in the base-topology-view-data storage unit 3-2, and makes a partial copy of the main-topology-view data only with respect to data that is accessible by the network-management operator, thereby creating (5-8) dependent-topology-view data.

The newly created dependent-topology-view data is stored in the dependent-topology-view-data storage unit 3-3. This ends the process of creating dependent-topology-view data.

In the manner as described above, dependent-topology-view data is created by copying the base-topology-view data such that the dependent-topologi-view data includes only the network elements and links accessible by the network-management operator. This achieves an easy creation of dependent-topology-view data that keeps consistency with the base-topology-view data.

Figure 6:
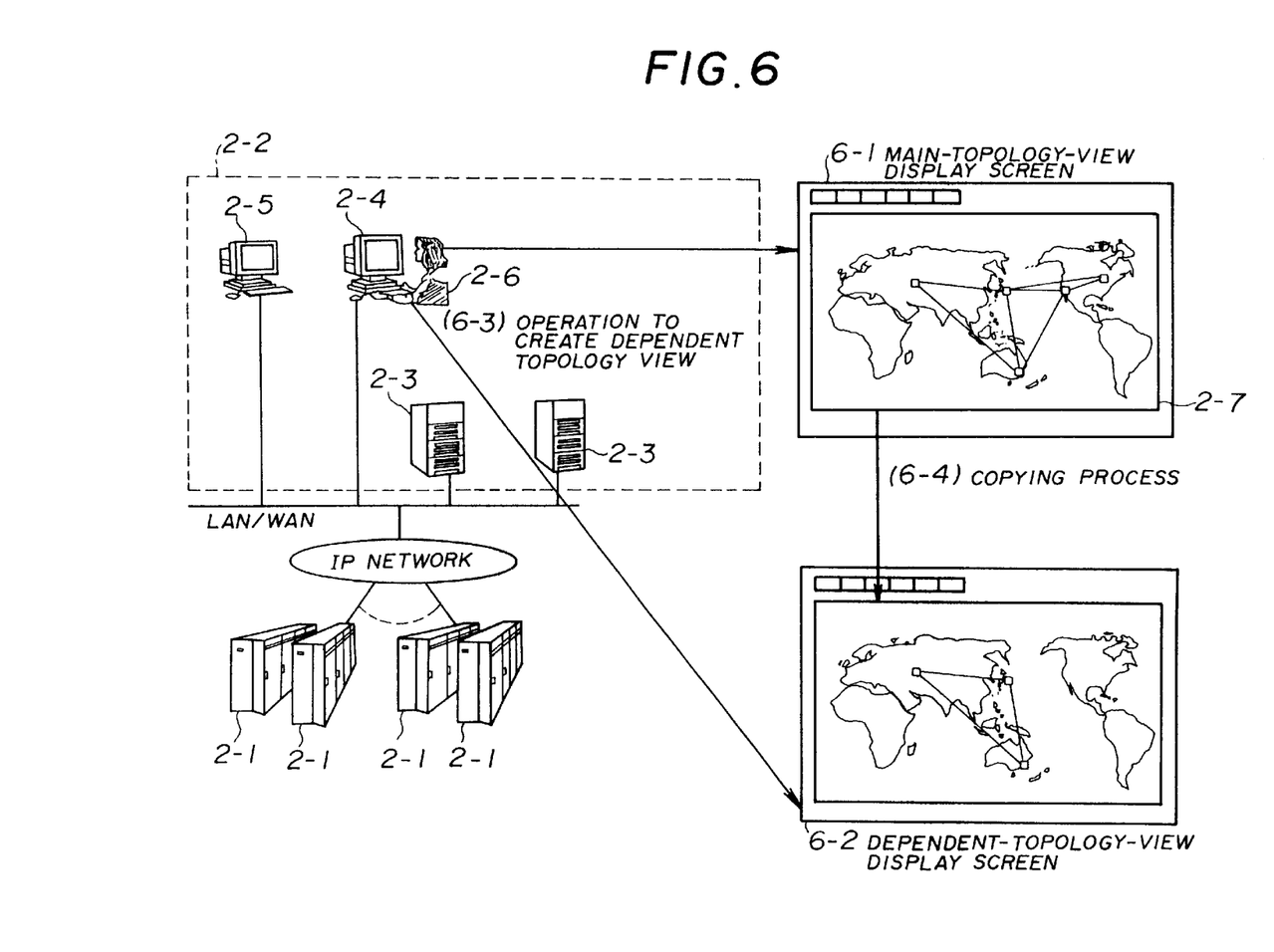
FIG. 6 is an illustrative drawing for explaining creation of dependent-topology-view data according to the present invention.

FIG. 6 is an illustrative drawing for explaining creation of dependent-topology-view data according to the present invention. In FIG. 6, the same elements as those of FIG. 2 and FIG. 4 are referred to by the same numerals. FIG. 6 shows a main-topology-view display screen 6-1 and a dependent-topology-view display screen 6-2.

When the network-management operator 2-6 operates the network-management-client device 2-4 to create (6-3) a dependent topology view, the main-topology-view data is partially copied (6-4) in the network-management-server device 2-3 to make a dependent topology view including only the accessible network elements. Then, the dependent topology view is displayed on the dependent-topology-view display screen 6-2 of the network-management-client device 2-4.

In what follows, control of an access right will be described with reference to FIG. 5.

In FIG. 5, the access-authorization table is stored in the security-data storage unit 3-4. The topology-view-control unit 5-1 issues a reference request (5-4) to the access-authorization-control unit 1-4 to inquire about access authorizations of the network-management operator.

In response to the reference request (5-4), the access-authorization-control unit 1-4 accesses (5-5) the access-authorization table of the security-data storage unit 3-4, and obtains information on access authorization of the network-management operator with regard to topology views and network elements.

The access-authorization-control unit 1-4 checks the access-authorization information and the configuration-management data of the dependent topology view obtained (5-7) from the dependent-topology-viewdata storage unit 3-3. Then, the access-authorization-control unit 1-4 transmits a result (5-6) of the check to the configuration-management-data storage unit 3-1.

Based on the check result (5-6) from the access-authorization-control unit 1-4, the topologi-view-control unit 5-1 controls access to actual network elements and actual links of the topology view as well as a background view as such an access is made by the terminal of the network-management operator.

Figure 7:
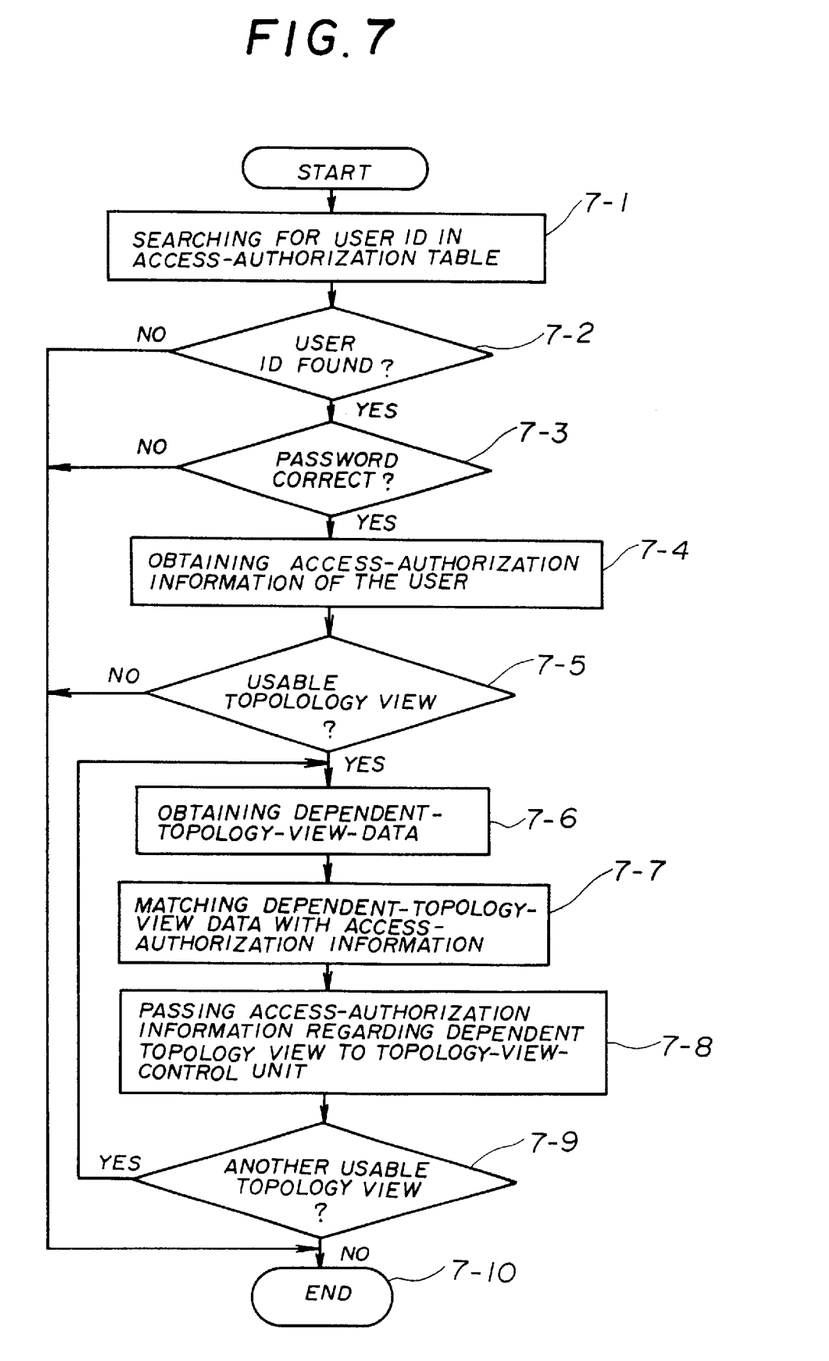
FIG. 7 is a flowchart of a process of controlling a right to access a topology view according to the present invention.

FIG. 7 is a flowchart of a process of controlling a right to access a topology view according to the present invention.

At a step 7-1, the access-authorization-control unit refers to the access-authorization table by using an ID (identification number) of a user (network-management operator) who made an access request.

At a step 7-2, a check is made as to whether the user ID is found in the access-authorization table. If it is found, at a step 7-3, a check is made as to whether a password corresponding to the user ID is correct. If it is correct, at a step 7-4, information about access authorizations of the user of this user ID is obtained.

At a step 7-5, a check is made as to whether there is a usable topology view according to the access-authorization information obtained at the step 7-4. If there is, at a step 7-6, dependent-topologi-view data of this usable topology view is obtained.

At a step 7-7, the access-authorization information obtained at the step 7-4 and the dependent-topology-view data obtained at the step 7-6 are matched. At a step 7-8, the access-authorization information regarding the dependent topology view (including access-authorization information about network elements of this dependent topology view) is passed along to the topology-view-control unit.

At a step 7-9, a check is made as to whether there is another topology view usable according to the access-authorization table. If there is, the procedure goes back to the step 7-6, and repeats the steps described above to pass along access-authorization information regarding a dependent topology view to the topology-view-control unit.

If a check result is negative at any one of the steps 7-2, 7-3, 7-5, and 7-9, the procedure goes to a step 7-10 to come to an end. Namely, if the user ID of the user is not found or a password is not correct, or if there is no usable topology view, the access request will be denied.

In what follows, selection of a topology view will be described with reference to FIG. 5.

In FIG. 5, when the network-management system receives a login-account-registration request from a network-management-operator terminal, a topology-view selection unit 5-3 refers (5-10) to configuration-management data of dependent topology views stored in the dependent-topology-view-data storage unit 3-3, and selects configuration-management data of a dependent topology view that corresponds to the provided login account. Further, the topology-view selection unit 5-3 registers (5-1) access-authorization information about a right to delete, a right to modify, a right to access, and the like in the access-authorization table of the security-data storage unit 3-4.

In the manner as described above, the login account is associated with the configuration-management data of the dependent topology view, and information about the login account with respect to the dependent topology view is stored in the access-authorization table. This insures that only a relevant dependent topology view is selected for network-management operations, thereby avoiding such a mistake as erasing a shared dependent topology view or avoiding a duplicate creation of a dependent topology view.

Figure 8:
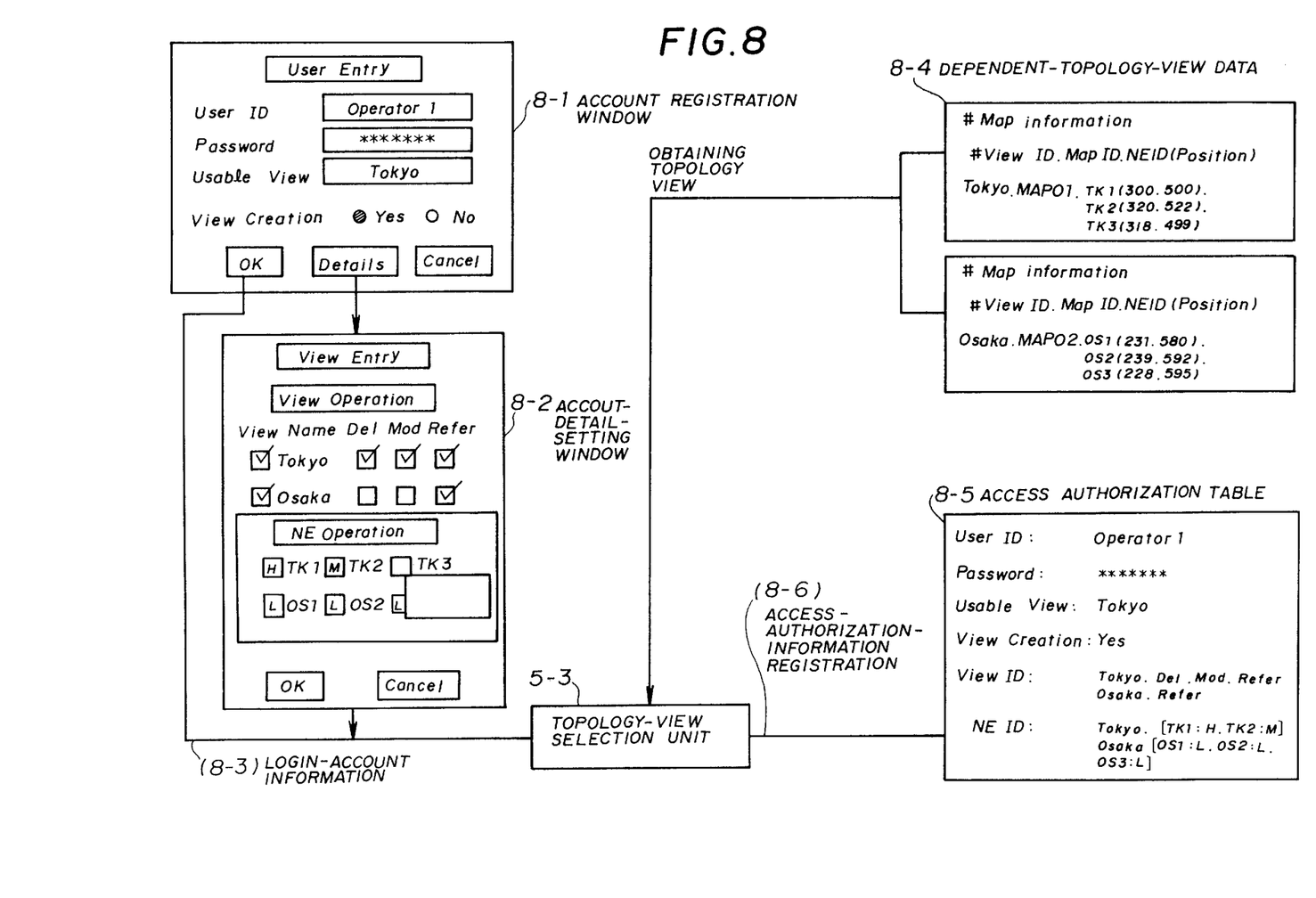
FIG. 8 is an illustrative drawing for explaining setting of access authorizations based on login-account information according to the present invention.

FIG. 8 is an illustrative drawing for explaining setting of access authorizations based on login-account information according to the present invention. A network-management operator make settings to his/her own account by defining a user ID, a password, a usable view, etc., on an account-registration window 8-1.

When a button "Details" is clicked on the account-registration window 8-1, an account-detail-setting window 8-2 is displayed. On the account-detail-setting window 8-2, settings are made with respect to access authorizations regarding dependent-topology-view data 8-4 as well as access authorizations regarding network elements of the dependent-topology-view data 8-4.

For example, check boxes for a right to delete, a right to modify, and a right to refer are checked to set respective access rights to topology views "Tokyo" and "Osaka". Further, other check boxes are provided for setting access rights to network elements (shown under the heading "NE operation" in FIG. 8).

After setting account information and access rights regarding topology views on the account-registration window 8-1 and the account-detail-setting window 8-2, a button "OK" is clicked to pass along login-account information (8-3) to the topology-view selection unit 5-3.

The topology-view selection unit 5-3 refers to a usable view defined in the login-account information (8-3), and checks if a name of the usable view matches a name of any view of the dependent-topology-view data 8-4. If there is a name match, access-authorization information is registered (8-6) in an access-authorization table 8-5. Here, the access-authorization information includes a user ID, a password, a usable view, a view creation, a view ID, etc., as shown in FIG. 8.

Figure 9:
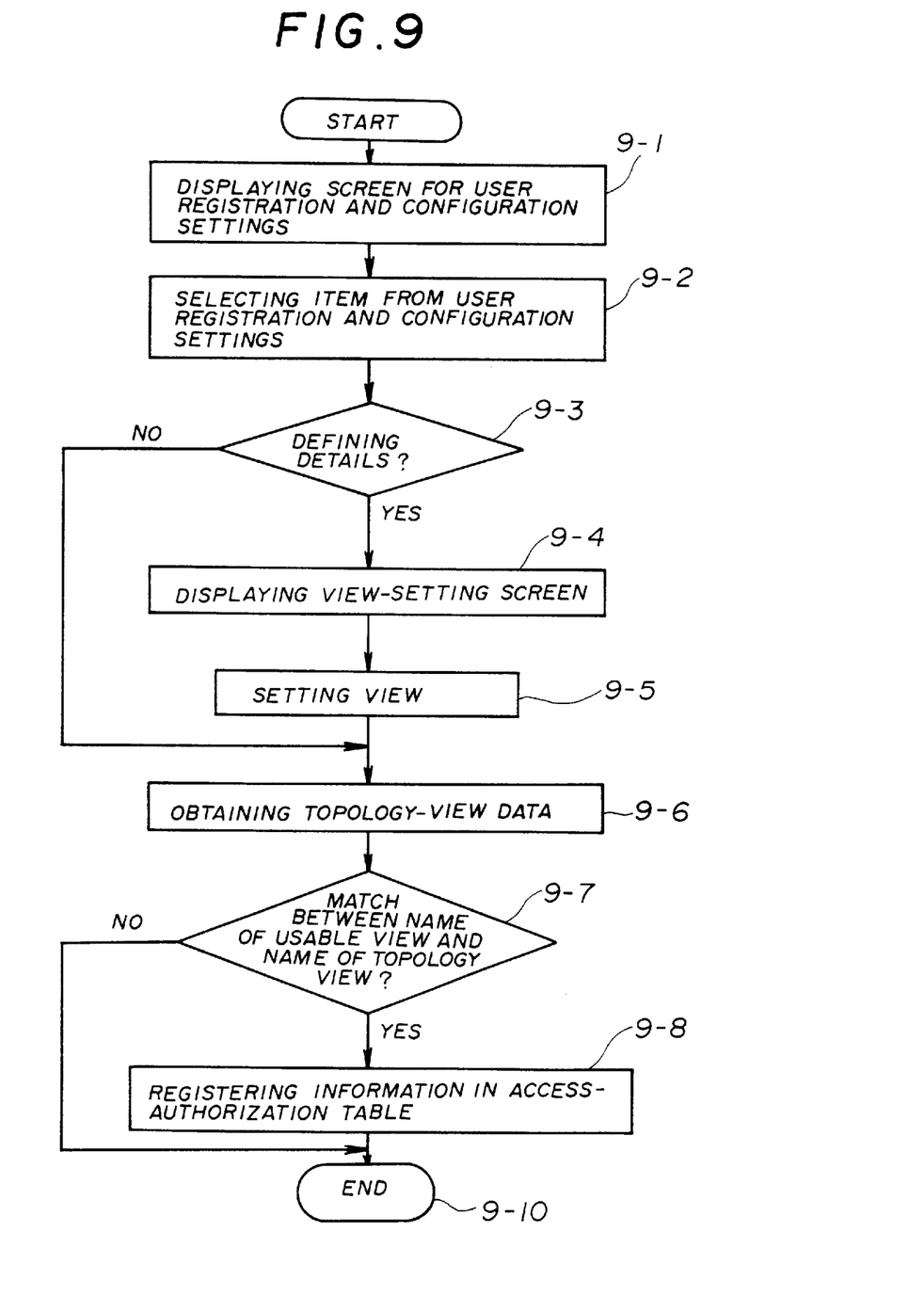
FIG. 9 is a flowchart of a process of setting access authorizations based on the login-account information according to the present invention.

FIG. 9 is a flowchart of a process of setting access authorizations based on login-account information according to the present invention.

At a step 9-1, a screen (window) is displayed for the purpose of user registration and configuration setting.

At a step 9-2, an item of user registration and configuration setting is selected.

At a step 9-3, a check is made as to whether detail settings are to be made. If they are, the procedure goes to a step 9-5.

At the step 9-5, settings are made with respect to a view.

If the check at the step 9-3 finds that detail settings are not to be made, or if settings of the view are completed at the step 9-5, topology-view data is obtained at a step 9-6.

At a step 9-7, a check is made as to whether a name of a usable view of the login account information matches a name of any view of the dependent-topology-view data.

If it matches, at a step 9-8, access-authorization information is set in the access-authorization table based on the login-account information. If the check at the step 9-7 gives a negative answer, the procedure goes to a step 9-10 to come to an end without making a setting of access-authorization information.

As described above, the present invention defines access authorizations of each network-management operator with regard to shared topology view data so as to control each operator's access to shared topology view data. This insures security of management of topology view data.

Further, a dependent topology view is created by making a partial copy of a base topology view. This achieves an easy creation of a dependent topology view that is consistent with the base topology view.

Further, access control and management of the base-topology-view data is performed separately from access control and management of dependent-topology-view data, thereby achieving a simple control process. Further, access control based on the hierarchical structure can enhance security of access to the base-topology-view data.

The present invention permits control of topology view data based on access authorizations defined with respect to each network element of a topology view. This allows a displayed topology view to include only those network elements and links therebetween which are relevant to actual network-management operations.

Moreover, the login-account information and the topology view data are associated with each other such that some settings of a login account are made with respect to topology view data. This insures that only a topology view relevant to network-management operations is selected, thereby avoiding an erroneous erasure of shared topology view data and avoiding a duplicate creation of unnecessary topology view data.

Further, the present invention is not limited to these embodiments, but various variations and modifications may be made without departing from the scope of the present invention.

The present application is based on Japanese priority application No. 10-246722 filed on Sep. 1, 1998, with the Japanese Patent Office, the entire contents of which are hereby incorporated by reference.

What is claimed is:

1. A system for controlling topology views for operators in network management, comprising:

a data-storage unit which stores data of a base topology view;

a security-management unit which controls access-authorization information with respect to each of the operators, said access-authorization information for a given operator defining network elements accessible by the given operator; and a topology-view-management unit which generates data of a dependent topology view by making a partial copy of the data of the base topology view only with respect to the network elements accessible by the given operator, thereby providing the dependent topology view to be presented to the given operator.

2. The system as claimed in claim 1, wherein the access-authorization information for the given operator further indicating whether the given operator has a right to delete, a right to modify, and a right to refer to the dependent topology view, and said topology-view-management unit controls access by the given operator to the dependent topology view based on the access-authorization information obtained from the security-management unit.

3. The system as claimed in claim 1, wherein said security-management unit sets the access-authorization information in accordance with login-accout information of each operator, the login-account information defining details about a login account of each operator.

4. A system for controlling topology views for operators in network management, comprising:

a data-storage unit which stores shared data of topology views;

a security-management unit which controls access-authorization information with respect to each of the operators, said access-authorization information for a given operator defining whether the given operator has a right to create, a right to delete, a right to modify, and a right to refer to one of the topology views; and a topology-view-management unit which controls access by the given operator to the one of the topology views based on the access-authorization information for the given operator.

5. A method of controlling topology views for operators in network management, comprising the steps of:

storing data of a base topology view;

defining access-authorization information with respect to each of the operators, said access-authorization information for a given operator indicating network elements accessible by the given operator; and generating data of a dependent topology view by making a partial copy of the data of the base topology view only with respect to the network elements accessible by the given operator, thereby providing the dependent topology view to be presented to the given operator.

6. The method as claimed in claim 5, wherein the access-authorization information for the given operator further indicating whether the given operator has a right to delete, a right to modify, and a right to refer to the dependent topology view, and said method further comprising a step of controlling access by the given operator to the dependent topology view based on the access-authorization information regarding the right to delete, the right to modify, and the right to refer to the dependent topology view.

7. The method as claimed in claim 5, further comprising a step of setting the access-authorization information in accordance with login-account information of each operator, the login-account information defining details about a login account of each operator.

8. A method of controlling topology views for operators in network management, comprising the steps of:

storing shared data of topology views;

defining access-authorization information with respect to each of the operators, said access-authorization information for a given operator defining whether the given operator has a right to create, a right to delete, a right to modify, and a right to refer to one of the topology views; and controlling access by the given operator to the one of the topology views based on the access-authorization information for the given operator.

* * * * *